April 7, 1925.

H. WEICHSEL 1,532,288

ALTERNATING CURRENT MOTOR

Filed June 28, 1924.

INVENTOR
Hans Weichsel

BY E. E. Huffman
ATTORNEY

Patented Apr. 7, 1925.

1,532,288

UNITED STATES PATENT OFFICE.

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE.

ALTERNATING-CURRENT MOTOR.

Application filed June 28, 1924. Serial No. 722,904.

*To all whom it may concern:*

Be it known that I, HANS WEICHSEL, a citizen of the United States of America, residing at the city of St. Louis, State of Missouri, United States of America, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates to the form and disposition of windings in an alternating current motor, particularly self-excited synchronous induction motors of the type herein set forth. The object of the invention is to make possible the employment of a minimum amount of copper to secure close approximation to sine shape field distribution, and to so position the two windings employed as to secure the most effective action of the winding which produces the synchronizing torque.

Figure 1:
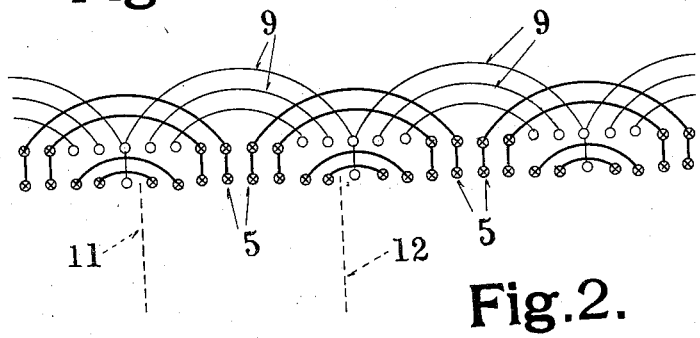
Figure 2:
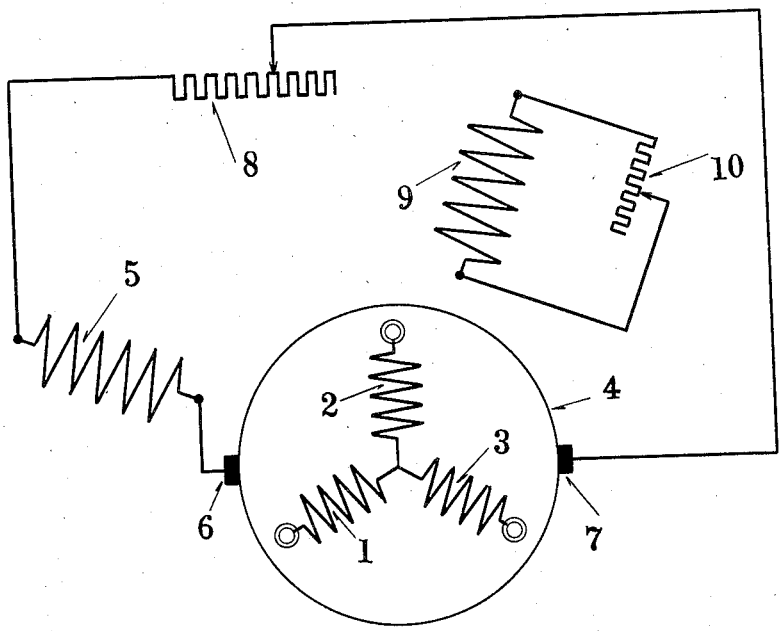

In the accompanying drawings Figure 1 diagrammatically indicates my improved winding arrangement; and Figure 2 is a diagrammatic representation of a self-excited synchronous motor to the secondary winding of which the winding arrangement in Figure 1 is applicable.

The machine illustrated in Figure 2 comprises a rotor carrying polyphase windings 1, 2 and 3 supplied with line current through slip rings, as indicated. The rotor also carries a commuted winding 4 which may or may not be interconnected with the polyphase winding. The stator is provided with a unidirectional exciting winding 5 preferably displaced by a small angle from the axis of the brushes 6 and 7 with which brushes it is connected in series over adjustable resistance 8. The stator is also provided with a second winding 9 which is either short-circuited or closed on itself over adjustable resistance 10. This winding 9 is preferably displaced 90 electrical degrees from the winding 5.

In the operation of the machine described resistances 8 and 10 are given a suitable value and line current is supplied to the rotor slip rings. Windings 5 and 9 then act as polyphase secondary windings cooperating with the revolving field produced by the rotor polyphase windings and the machine starts with a good torque as an induction motor. As the speed approaches synchronism the induction motor torque of course becomes small but the connections are so made that the E. M. F. appearing at the brushes 6 and 7 and impressed on the winding 5, cooperates with the E. M. F. induced in this winding to produce an exciting magnetization cooperating with currents in the polyphase winding of the rotor to produce a strong torque tending to bring the machine to synchronous speed.

While the best possible position of the windings 5 from the standpoint of producing synchronizing torque would be in the axis of the brushes, I prefer to displace the winding slightly from that axis in order that one component of its magnetization may, during normal operation, be so located as to satisfactorily influence the power factor of the machine. When approximately synchronous speed has been attained the resistance 10 may be cut out and the winding 9 short-circuited, and the resistance 8 may be either cut out or adjusted to its operating value. Should the machine be pulled out of synchronism due to over load, it will continue to operate as an induction motor.

My invention is applicable to the type of machine hereinabove described, and resides in the combination of the form, disposition and relation of the stator windings 5 and 9. Referring to Figure 1, these windings are distributed and are of the concentric type. The windings are also "tapered" as shown—that is to say, the terminal slots in each winding belt of each winding (one winding belt of winding 5 extends from line 11 to line 12) contain fewer conductors than the intermediate slots in that belt, the advantage of this arrangement being that it produces an approximation of the desired sine shape field. The winding belts of windings 5 and 9 overlap and the conductors of winding 9 are placed in the outer portion of those slots which contain conductors of both windings. This arrangement places the winding 5 in the best possible magnetic relation with the rotor polyphase winding and consequently the best relation for the production of synchronizing torque.

Having fully described my invention, what I claim as new and desire to secure by Letters Patent of the United States is:

In an alternating current motor, the combination of an inducing member provided with a commutator and brushes thereon, and an induced member provided with an exciting winding in circuit with the brushes and with a second winding displaced from the excited winding, said windings of the induced member being of the concentric distributed type overlapping each other and having a smaller number of conductors in the terminal slots of each winding belt than in intermediate slots of said belt, the conductors of the exciting winding being located nearest the inducing member in such slots as contain conductors of both windings.

In testimony whereof I have hereunto set my hand this the 24th day of June, 1924.

HANS WEICHSEL.